United States Patent [19]

Becheret

[11] Patent Number: 5,032,327
[45] Date of Patent: Jul. 16, 1991

[54] METHOD AND A DEVICE FOR THE SHAPING AND CURING OF THERMOSETTING PLASTIC MATERIAL WORK-PIECES

[75] Inventor: Claude Becheret, Levis Saint Nom, France

[73] Assignee: Societe Anonyme Des Usines Chausson, Hauts de Seine, France

[21] Appl. No.: 366,372

[22] Filed: Jun. 14, 1989

[30] Foreign Application Priority Data

Jun. 16, 1988 [FR] France ............................ 88 08081

[51] Int. Cl.⁵ ............................................. B29C 35/12
[52] U.S. Cl. ..................................... 264/26; 264/40.6; 264/325; 264/DIG. 46; 425/174.8 R
[58] Field of Search ................... 264/25, 26, DIG. 46, 264/DIG. 45, 40.6, 325; 425/174.8 R, 174.8 E, 174.6, 174, 174.4, 384

[56] References Cited

U.S. PATENT DOCUMENTS

| 3,420,923 | 1/1969 | Ashworth et al. | 264/26 |
| 3,585,258 | 6/1971 | Levinson | 264/26 |
| 4,060,364 | 11/1977 | Gras | 425/174 |
| 4,269,581 | 5/1981 | Ury et al. | 425/174.8 R |
| 4,298,324 | 11/1981 | Soulier | 264/26 |
| 4,323,745 | 4/1982 | Berggren | 264/26 |
| 4,512,942 | 4/1985 | Babbin et al. | 426/174.4 |

FOREIGN PATENT DOCUMENTS

| 0233846 | 8/1987 | European Pat. Off. | 425/174 |
| 2854173 | 6/1980 | Fed. Rep. of Germany | 264/26 |

Primary Examiner—Jeffery Thurlow
Attorney, Agent, or Firm—Browdy and Neimark

[57] ABSTRACT

Forming tools are arranged inside a metallic caisson formed by means of open boxes provided with nesting portions. The forming tools are connected to a microwave generator and are made of a material with a small absorption capacity for the microwaves and adapted for supporting pressure within the range of 50 to 200 bars. The forming tools have working faces of a shape mating that of a work piece to be obtained.

10 Claims, 2 Drawing Sheets

METHOD AND A DEVICE FOR THE SHAPING AND CURING OF THERMOSETTING PLASTIC MATERIAL WORK-PIECES

FIELD OF THE INVENTION

This invention applies to thermosetting plastics materials particularly of the unsaturated polyester resin type, that is to resins which, under the action of heat, start to get fluidized, then increase in viscosity, and finally pass progressively to the solid state.

BACKGROUND OF THE INVENTION

A known transformation mode for thermosetting resins is a molding under compression, consisting in mold forming the material (for example an unsaturated polyester resin reinforced with glass fibers and including a filler, a catalyst and a release or stripping agent) under a conjugated action of a pressure of 50 to 200 bars and a temperature brought to about 110° C.-160° C.

Heating of the material is then obtained by heat transfer between the mold working surfaces and the work piece. Since this heating is effected by conduction, homogeneity of the heating is difficult to control. The time during which the temperature is increasing is in fact imposed by various factors, amongst which is the geometry of the work piece.

The mold is heated by a network of electric resistances or by heat conveying fluid circulation channels.

The arrangement of the fluid distribution channels is difficult to make for obtaining a uniform heating. Temperature differences are therefore found between various points of the working surfaces, resulting in aspect faults which are incompatible with a required quality for the finished piece.

Moreover, since the heat transfer by conduction is not homogeneous in volume, it is therefore the surface of the work piece which is first brought to temperature prior to the core of the work-piece. The subsequent polymerization or curing obtained is therefore not uniform, and it results therefrom, very often, inner stresses causing deformations which can appear a long time after the piece has been made.

The present invention provides a new method and a new device solving the hereabove exposed difficulties.

SUMMARY OF THE INVENTION

According to a first aspect of the invention, the method for forming and curing a thermosetting plastics materials work piece placed in a metallic caisson connected to a generator of microwaves, comprises the steps of forming the metallic caisson by means of open boxes provided with nesting portions; connecting the metallic caisson to the plates of a press; arranging forming tools inside the metallic caisson, the forming tools being made of a material with a small absorption capacity for the microwaves and adapted for supporting pressures within the range of 50 to 200 bars and having working surfaces of a shape which is mating that of the work piece to be obtained introducing a material between the forming tools and activating the plates of the press and the generator.

The invention is also applicable to the device for practicing the above method.

According to this second aspect of the invention, the device includes a metallic caisson comprising two boxes provided with nesting portions, these two boxes containing forming tools of a material with a small absorption capacity for microwaves transmitted by waveguides connected to a generator controlled by a power adjusting device.

Various other features of the invention will become more apparent from the hereafter detailed description.

BRIEF DESCRIPTION OF THE DRAWINGS

An embodiment of the invention is shown by way of non limiting example in the accompanying drawings, wherein.

DETAILED DESCRIPTION OF A PREFERRED EMBODIMENT

Figure 1:
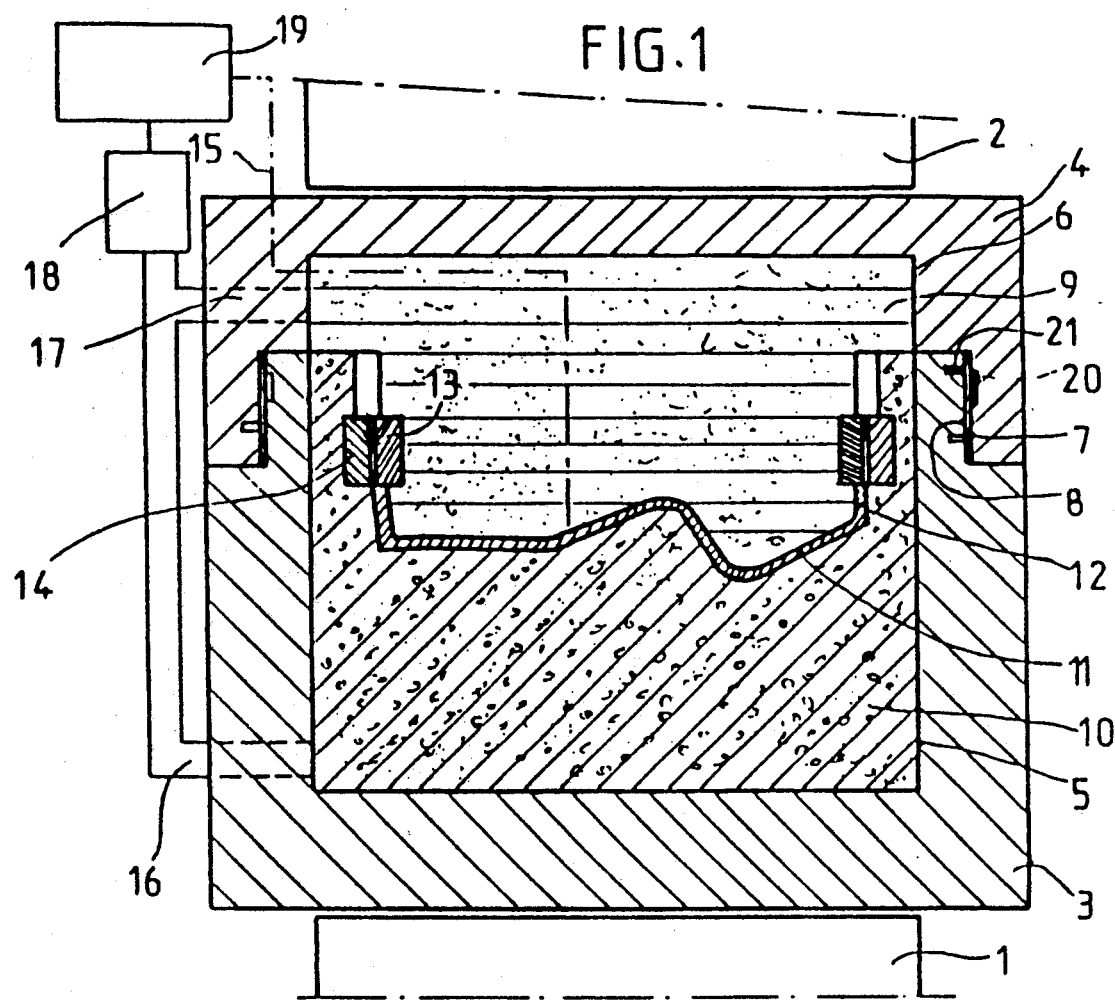
FIG. 1 is a schematic elevation cross sectional view of a device for practicing the method of the invention.

Referring now to the drawings, there is shown schematically the lower 1 and upper 2 plates of a press. The plates 1 and 2 respectively support open boxes 3 and 4 defining chambers 5 and 6 of a standard type metallic caisson. The boxes 3, 4 include mutual nesting portions 7, 8 forming throttling or restricting zones provided with traps 20 or seals preventing any dispersion, toward the outside, of the microwaves developed in the caisson. The chambers 5 and 6 contain forming tools 9 and 10, viz. a punch and a matrix made of a material which is relatively transparent to microwaves, and therefore only little heated by the microwaves, and able to support pressures possibly reaching 200 bars.

Materials convenient for making the forming tools 9 and 10 may be tetrafluoroethylene resin or polymer, ceramics, epoxy resin concretes, and other materials known in the art, possibly combined or mixed together. The punch 9 and matrix 10 include faces 9a, 10a opposite each other, constituting the working faces and consequently shaped so as to be complementary to the shape of the two faces of a work piece 11 which has to be formed and polymerized or cured. The working faces 9a and 10a are obtained by milling or molding on a reference piece.

In the example shown, the work piece 11 has, on its periphery, an edge 12. The work piece 11 is of a thermosetting synthetic material, typically an unsaturated polyester resin reinforced with glass, carbon or other fibers and including a filler, a catalyst and a release or stripping agent, such a material being receptive to microwaves.

Initially, the material of the work piece 11 is in the form of a paste, a sheet, etc., of a volume larger than that of the finished piece.

Since the punch 9 and the matrix 10 have to exert pressures which are relatively high on the work piece 11 during a molding cycle, it is compulsory to provide them with peripheral compression members such as those shown at 13 and 14.

Figure 2:
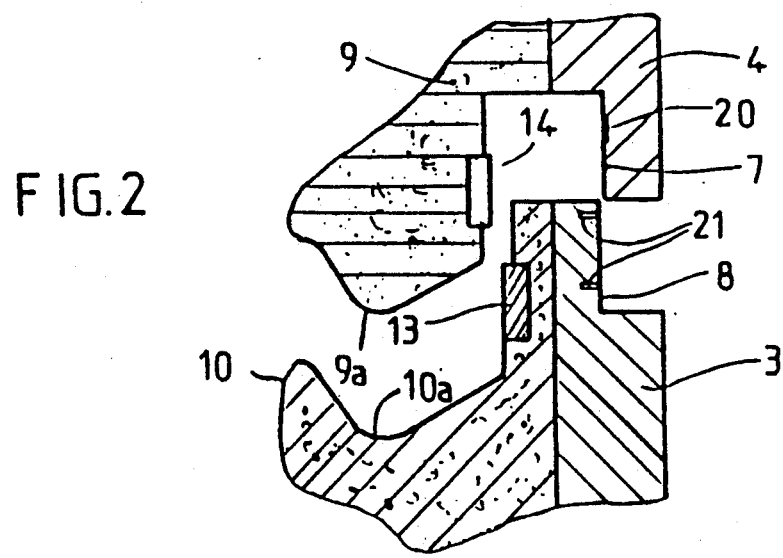
FIG. 2 is a partial elevation cross-sectional view illustrating a characteristic position of members shown in FIG. 1.

FIG. 2 shows compression peripheral members 13 and 14, advantageously of steel, and which are fixedly added to the punch 9 and matrix 10. This arrangement allows an interchanging of the tools according to the work piece 11 to be produced in the boxes 3 and 4 of the microwave tight standard caisson.

As known, the microwave heating consists in emitting an electromagnetic radiation, with assistance of an antenna of a magnetron, towards dielectric materials, via waveguides.

As shown schematically in FIG. 1, waveguides 16 and 17 connect the microwave seal tight caisson formed by the chambers 5, 6 of the boxes 3, 4, to a microwave generator 18. The microwave generator 18 is controlled by a device 19 for adjusting the generator power as a function of the work-piece temperature and of the generator characteristics.

Figure 3:
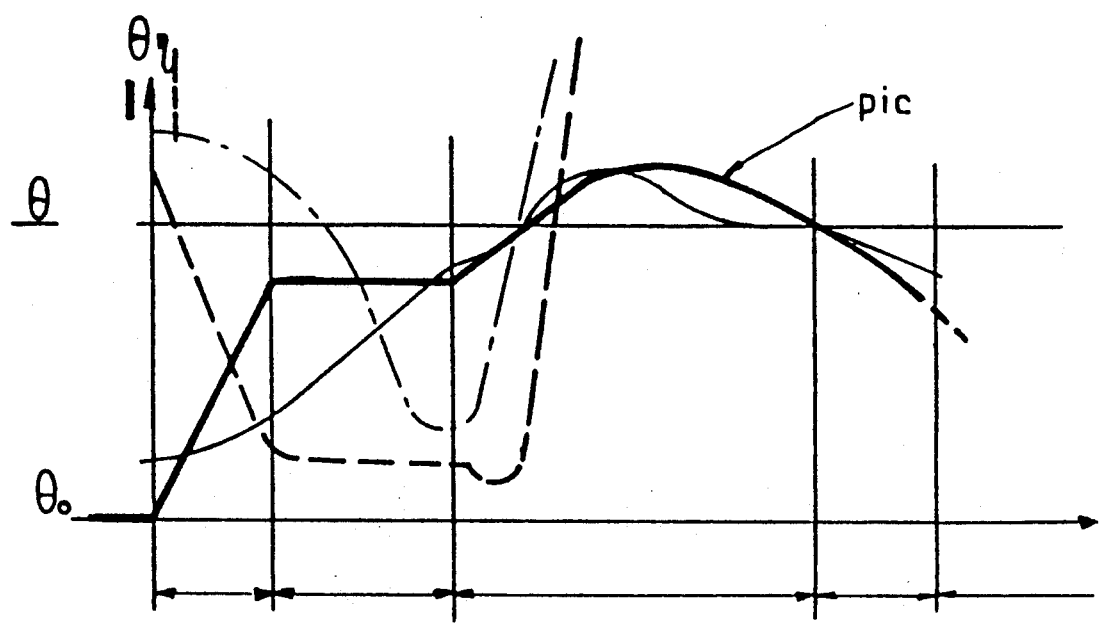
FIG. 3 is a graph showing a molding cycle with microwave heating or dielectric loss heating with respect to a molding cycle with conduction heating, time being plotted on the x-axis and temperature on the y-axis.

For making the work piece 11, one proceeds as shown hereafter with reference to FIG. 3.

The quantity of material necessary for obtaining the final volume of the finished piece is placed in the mold, this material being in a pasty form or at least adapted to flow at room temperature.

The press is closed until complete setting of the material; the caisson formed by the boxes 3, 4 is tight sealed against the microwaves by metallic seals 20 cooperating with grooves 21 forming microwave traps; the air contained in the caisson is discharged via the compression members 13 and 14; the microwave generator 18 is energized; the material contained in the mold heats up from $\theta_o$ (which is the first heating time, for example from 20° C. to 120° C.); viscosity of the material decreases while the press moves further down, and the mold applies the useful maximum pressure on the material which flows and fills all the cavities of the mold.

Once the material has completely flowed, there is produced a second heating time (from 120° C. to 150° C.) in order to cross-link the material; from a given temperature threshold ($\theta$ threshold), the material polymerizes or cures with an exothermal reaction, the viscosity becoming almost infinite, and the profile of the work-piece becoming solidified. At the end of the cycle, the press is opened and the work piece which has been produced is extracted by stripping.

The work piece 11 being formed by tools made of a material which is permeable or relatively permeable to microwaves, the microwave heating is effected in a homogeneous way, in surface as well as in volume, in all portions of the work piece, and this even when there is an abrupt change of direction in the work piece or portions of the work piece which are more or less thick.

Since the heating is carried out inside the material forming the work piece, the work piece cures in a uniform manner, thereby eliminating the hazards of inner stress formations, contrary to the case of the conduction heating as will appear from the example shown in parallel in FIG. 3.

Moreover, such a microwave heating obtains a temperature of the work piece which is function of the power applied by the generator 18, thereby modulating the duration of a manufacturing cycle. This type of heating is particularly appropriate to an automated control. Thus, it is possible to slave in a known manner the heating to the temperature of the work piece 11 or to any other parameters (such as the curing state) in order to optimize production output of the work piece.

The microwave heating, due to the fine temperature regulation which is made possible, allows approaching to the closest the minimum viscosity thereshold without going over the cross-linking threshold. Thus, flowing of the material is facilitated while reducing the required pressure which, for a same work-piece, provides to use presses of smaller power than when resorting to conduction forming and heating.

By modulating the heating power, by slaving the timings as a function of the temperature and by controlling the press by an automaton, the cycle timing and the press efforts are minimized, and the result is a gain of time, a better quality for the finished piece thus formed, as well as a saving of energy.

What is claimed is:

1. A method for forming and curing a thermosetting plastic material work piece placed in a metallic caisson connected to a generator of microwaves comprising the steps of forming the metallic caisson by means of open boxes provided with nesting portions; connecting the metallic caisson to the plates of a press; providing forming tools made of a material with a small absorption capacity for the microwaves and adapted for supporting pressures within the ranges of 50 to 200 bars and having working faces of a shape which is mating that of the work piece to be obtained; arranging said forming tools inside the metallic caisson; introducing a material between the forming tools and activating the plates of the press and the generator.

2. A method as set forth in claim 1, comprising the further step of slaving the microwave generator power to temperature of the work piece to be obtained.

3. A method as set forth in claim 1, comprising the further step of reducing the pressure required for obtaining the work piece, by a fine regulation of temperature increase inside the metallic caisson.

4. A method as set forth in claim 1, comprising the further step of finely regulating temperature of the work piece, in order to minimize forming and curing cycle timings for the work piece.

5. A device for forming and curing a thermosetting plastic material work piece, which device includes a metallic caisson connected to plates of a press and comprising two boxes provided with nesting portions, said two boxes containing forming tools of a material with a small absorption capacity for microwaves transmitted by waveguides connected to a generator and a power adjusting device for controlling said generator.

6. A device as set forth in claim 5, wherein the forming tools are made of a punch and a matrix made of a material having a small absorption capacity for microwaves, and provided with compression members preferably of steel.

7. A device as set forth in claim 5, wherein the forming tools are interchangeable inside the caisson which is tight sealed to microwaves.

8. A device as set forth in claim 5, wherein said nesting portions are formed with grooves or metallic seals so to form a microwave trap.

9. A method as set forth in claim 1, wherein the material is a paste of a volume larger than that of the work piece to be obtained.

10. A method as set forth in claim 1, wherein the material is a sheet of a volume larger than that of the work piece to be obtained.

* * * * *